2 Sheets—Sheet

C. FASOLDT.

REGULATING WATCHES.

No. 7,514. Reissued Feb. 20, 1877.

Witnesses

Henry G. Muskett

Thomas Dermody

Inventor.

Charles Fasoldt by

William H. Son

Attorney

2 Sheets—Sheet 2.

C. FASOLDT.

REGULATING WATCHES.

No. 7,514. Reissued Feb. 20, 1877.

Witnesses.

E. J. Bennett

Harry Edwards

Inventor.

Charles Fasoldt, by William H. Low

Attorney

UNITED STATES PATENT OFFICE.

CHARLES FASOLDT, OF ALBANY, NEW YORK.

IMPROVEMENT IN REGULATING WATCHES.

Specification forming part of Letters Patent No. 42,175, dated April 5, 1864; reissue No. 7,514, dated February 20, 1877; application filed November 22, 1875.

*To all whom it may concern:*

Be it known that I, CHARLES FASOLDT, of the city and county of Albany and State of New York, have invented a new and useful Improvement in Watches, of which the following is a full and exact description, reference being had to the accompanying drawing, making a part of this specification, in which—

Figure 1:
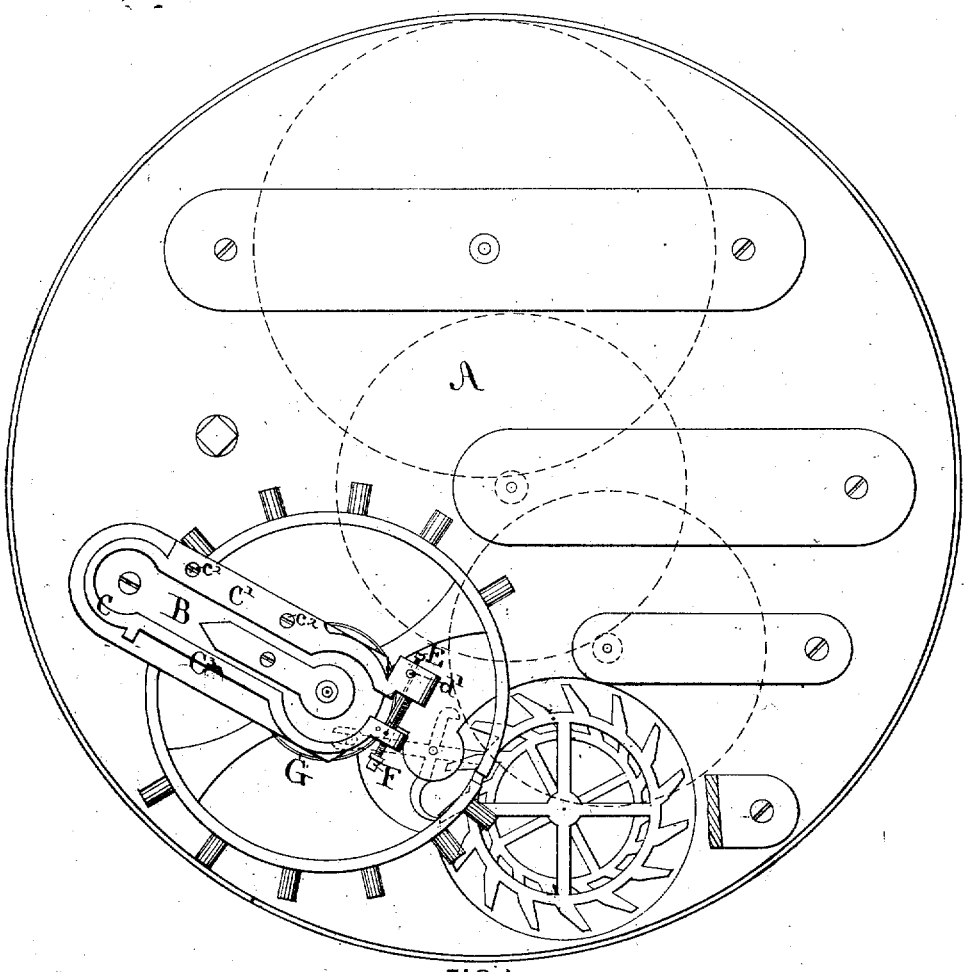
Figure 2:
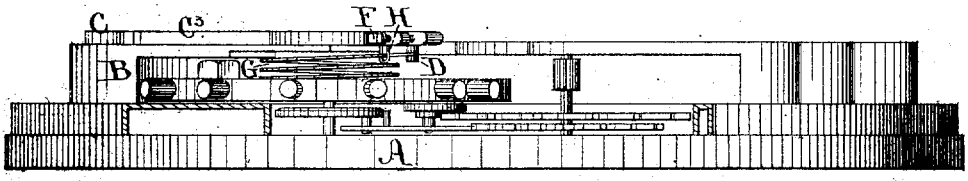
Figure 3:
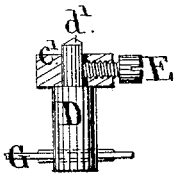
Figure 4:
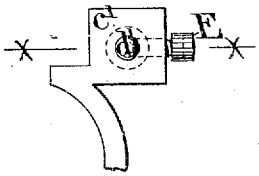

Figure 1 is a plan view of the works of a watch having my improvement; Fig. 2, an edge view of the same; Fig. 3 is a detached magnified elevation of the stud for holding the outer end of the hair-spring, showing a section of the fixed end of the spring at the line *x x*; and Fig. 4 a plan view of the same.

My invention relates to the time-regulating mechanism of watches, and to the manner of securing the stud to which the outer end of the hair-spring is fixed; and it consists of the devices for those purposes herein shown and described.

The object of my invention is to provide the means for effecting the most delicate and accurate regulation of the hair-spring to perfectly control the vibrations of the balance, to produce the correct running of the watch, and in such manner that when the correct adjustment of the parts is once obtained it can be perfectly preserved during the removal and replacement of the parts, when required, for cleaning or repairs.

As shown in the drawing, A is the foundation-plate of the watch, to which the various parts of the movement are secured in the usual manner, and to which no special reference is required, except to those parts relating to and constituting my invention. B is a bridge, forming the bearing for the upper end of the shaft of the balance-wheel, upon which is placed the bow-spring C, having one of its side bars $C^1$ secured in a fixed position by the screws $C^2$ to the bridge B. From the extremity of the stationary side bar $C^1$ a stud, D, is dependent, which has a shank, $d^1$, of smaller diameter, for entering the hole formed in the bar $C^1$ for its reception, and in which it is secured by the set-screw E. When preferred, the stud D may be inserted in a prolongation of the bridge B, or secured in a like manner to any other fixed and convenient point. The extremity of the free side bar $C^3$ is provided with a hole tapped to receive the regulating-screw F, the end of which bears against the fixed side bar $C^1$, for the purpose of forcing the two side bars apart against the resistance of the spring C, which, as the screw F is turned backward, forces the free side bar $C^3$ toward the stationary side bar $C^1$, and thereby carries the loop or fork (attached to the free side bar, as hereinafter described) toward the stud D, to which the outer end of the hair-spring is secured. From this it will be seen that the position of the loop or fork is changed in one direction by the adjusting-screw F, and in the reverse direction by means of the spring C. G is the hair-spring, the inner end of which is attached in the usual manner to the shaft of the balance-wheel and its outer end is secured to the stud D, the shank $d^1$ of which is flattened on the side against which the set-screw E bears, so as to insure the return of the stud and hair-spring to their correct positions after their removal for any purpose. This manner of securing the stud D is for the purpose of remedying the defect heretofore existing in the manner of securing them, which consisted in depending entirely upon the frictional adhesion of the shank when forced into a hole of slightly smaller diameter. When such a fastening is employed, great trouble is experienced to insert the stud in the hole so that the hair-spring will lead in the correct direction, whereby the proper regulation of the watch becomes greatly complicated. H is a loop or fork, dependent from the end of the side bar $C^3$, through which the outer convolution of the hair-spring G passes before it is attached to the stud D.

The regulation is effected by turning the screw F so as to increase or diminish the distance between the side bars $C^1$ and $C^3$, as occasion may require. In doing this the loop or fork H is correspondingly moved toward or from the stud D, diminishing or increasing the power of the hair-spring G. It will readily be seen that by means of the screw F the movement given to the loop or fork H may be confined to such minute distances as to render their measurement almost impossible, while the effect upon the action of the hair-spring in the regulation of the watch will be quite marked and perceptible, and that by a series of these very slight changes a perfect adjustment of the parts can be obtained to secure the running of the watch on perfectly correct time. This degree of perfection in the regulation of watches having the ordinary regulating mechanism, if it can be obtained at all, can only be effected by chance, as the adjustment of the time-regulator in that class of watches is dependent upon the uncertain action of the hand and eye. By my improvement, when the perfect adjustment of the regulation is once effected, by leaving the regulating-screw F undisturbed in its place, it can be retained through any subsequent removals and replacement of the parts, and by securing the stud D in the manner herein described, whereby I provide for its ready removal and restoration to its correct position, the maintenance of the regulation is greatly facilitated.

It is manifest that the regulating-screw F may be applied to any form of spring instead of the bow-spring C, herein described; and that it may be applied for the adjustment of the loop H in relation to the outer end of the hair-spring G in many different ways that will readily suggest themselves to those skilled in the art; and while I preferably apply it in the manner herein shown and described I do not confine myself to such a construction.

I claim as my invention—

1. In combination with the time-regulating mechanism of a watch, the regulating-screw F, as and for the purpose herein set forth.

2. The combination of the regulating-screw F and loop or fork H with the hair-spring G, as and for the purpose specified.

3. The combination of the regulating-screw F, loop or fork H, and stud D, with the hair-spring G, as and for the purpose specified.

4. The combination of the spring C and regulating-screw F, as and for the purpose set forth.

5. The combination of the stud D with the set-screw E, substantially as and for the purpose specified.

CHARLES FASOLDT.

Witnesses:

E. MAX FASOLDT,

WILLIAM H. LOW.